US010219646B2

(12) United States Patent
Fouquet et al.

(10) Patent No.: US 10,219,646 B2
(45) Date of Patent: Mar. 5, 2019

(54) ELECTRICAL APPLIANCE FOR PREPARING FOOD JUICE BY PRESSING

(71) Applicant: SANTOS, Vaulx-en-Velin (FR)

(72) Inventors: Nicolas Fouquet, Chassieu (FR); Cedric Gelin, Saint Fons (FR)

(73) Assignee: SANTOS, Vaulx-en-Velin (FR)

( * ) Notice: Subject to any disclaimer, the term of this patent is extended or adjusted under 35 U.S.C. 154(b) by 38 days.

(21) Appl. No.: 15/293,575

(22) Filed: Oct. 14, 2016

(65) Prior Publication Data
US 2017/0105565 A1    Apr. 20, 2017

(30) Foreign Application Priority Data
Oct. 20, 2015 (FR) ...................................... 15 59986

(51) Int. Cl.
*A47J 19/02* (2006.01)
(52) U.S. Cl.
CPC .................................. *A47J 19/025* (2013.01)
(58) Field of Classification Search
None
See application file for complete search history.

(56) References Cited

U.S. PATENT DOCUMENTS

| | | | |
|---|---|---|---|
| 4,681,031 A * | 7/1987 | Austad .................. | A47J 19/027 99/511 |
| 5,771,791 A * | 6/1998 | Ling ...................... | A47J 19/027 241/101.2 |
| 8,534,189 B2 * | 9/2013 | Pavero .................... | A47J 43/04 99/348 |
| 2006/0000327 A1 * | 1/2006 | Lin ........................ | A47J 19/027 83/355 |
| 2007/0269564 A1 * | 11/2007 | Bertocchi ................ | A23N 1/00 426/489 |

(Continued)

FOREIGN PATENT DOCUMENTS

| CN | 103 082 865 A | 5/2013 |
|---|---|---|
| CN | 104 323 693 A | 2/2015 |

(Continued)

OTHER PUBLICATIONS

FR Search Report, dated Jun. 7, 2016, from corresponding FR application.

*Primary Examiner* — Ibrahime A Abraham
*Assistant Examiner* — Gyounghyun Bae
(74) *Attorney, Agent, or Firm* — Young & Thompson (57) ABSTRACT

The appliance includes a chute for admitting food in a downward direction; a screw for processing foods leaving the chute, which is centered on an axis and includes an upper stage, provided with a sweeper acting on the foods leaving the chute to fragment them, and a separate lower stage to drive food fragments coming from the upper stage of the screw downward and press them; a chamber for receiving the screw, which is substantially centered on the axis and which includes an upper part, connected to the outlet of the chute to receive the foods leaving the chute and surrounding the upper stage of the screw, and a lower part, surrounding the lower stage of the screw to separate the juice from the food fragments when the latter are pressed by the lower stage of the screw; and a driving system including an electric motor for driving the screw.

20 Claims, 7 Drawing Sheets

(56) References Cited

U.S. PATENT DOCUMENTS

| | | | |
|---|---|---|---|
| 2012/0240792 A1* | 9/2012 | Clarke | A23N 1/02 99/509 |
| 2013/0074707 A1* | 3/2013 | Asbury | A23N 1/02 99/495 |
| 2013/0220146 A1* | 8/2013 | Bertocchi | A23B 7/06 99/483 |
| 2014/0033934 A1* | 2/2014 | Chou | A23N 1/02 99/501 |
| 2014/0053741 A1* | 2/2014 | Chou | A47J 19/06 99/513 |
| 2014/0283692 A1* | 9/2014 | So | A47J 43/24 99/495 |
| 2014/0283693 A1* | 9/2014 | Raude | A23N 1/02 99/513 |
| 2015/0053098 A1 | 2/2015 | Kim | |
| 2015/0342410 A1* | 12/2015 | Jeong | F16H 1/46 475/269 |
| 2016/0157656 A1 | 6/2016 | Cheung et al. | |
| 2016/0302466 A1* | 10/2016 | Kano | A23L 19/09 |

FOREIGN PATENT DOCUMENTS

| | | |
|---|---|---|
| CN | 204 218 617 U | 3/2015 |
| EP | 2 326 220 A2 | 5/2011 |
| EP | 2 659 807 A1 | 11/2013 |
| EP | 2 730 200 A1 | 5/2014 |
| EP | 3 028 607 A1 | 6/2016 |
| KR | 10-1267808 B1 | 5/2013 |

\* cited by examiner

ELECTRICAL APPLIANCE FOR PREPARING FOOD JUICE BY PRESSING

FIELD OF THE INVENTION

The present invention relates to an electrical appliance for preparing food juice by pressing.

BACKGROUND OF THE INVENTION

This type of appliance is well-known: inside a juice separating chamber, a pressing screw, typically bullet-shaped, is rotated by an ad hoc electric motor, the mechanical output of which is coupled to the base of the screw, while food, entering at the top of the chamber via an intake chute toward the bottom, is, under the action of the screw, gradually driven toward the bottom and pressed against the interface of the bottom of the chamber. The juice is collected for consumption by the user, while separately, the pressed food residue is discharged. The interest of this type of appliance lies in obtaining high-quality juice, while largely preserving its gustatory and organoleptic properties. Examples of this type of appliance are provided, inter alia, in EP 2,326,220.

One of the technical limitations of this type of appliance is the maximum size of the food that can be pressed. Indeed, in order for the pressing screw to be able to "catch" this food and begin to drive it downward to press it, it is necessary, for a given screw diameter, for this food to be small enough, the maximum size of this food typically having to be smaller than the largest radius of the pressing screw. The user is therefore quite frequently required to chop the food before placing it in the appliance. For example, the intake of a whole apple is impossible.

To bypass this difficulty, EP 2,326,220, through the embodiments of its FIGS. 1 to 5, proposed to arrange, between the outlet of the intake chute and a lower pressing part of the screw, a food fragmenting member, which consists of a cutting edge or a sharp blade, in the form of a helix portion, and which is securely carried by an upper part of the screw: due to the joint rotation of the upper and lower parts of the screw, this cutting edge or blade sweeps the outlet of the chute, such that the food leaving the outlet is cut into two slices. The implementation of such cutting of the food by the upper part of the pressing screw nevertheless poses practical difficulties. Indeed, considered alone, this cutting is done in the direction where it leads to the cut pieces of food being sent to the lower part of the screw in order for that lower part to press them. However, due to the screw pressing technique itself, the maximum quantity of food that can be "swallowed" and effectively pressed by the lower part of the screw is limited whereas, for the same rotational driving speed of the screw around itself, the maximum quantity of food that can be cut by the upper part of this screw is much larger for most foods. As a result, during use, the food cut by the upper part of the screw quickly saturates its lower part, which then rotates in a purée of food that is not completely pressed, while being incapable of "catching" the new pieces of cut food, since the latter are floating in the aforementioned purée. The appliance then becomes unusable and must be fully cleaned.

For its part, CN 204,218,617 proposes to arrange, at the apex of the pressing screw, a cutting tool which, by rotating around itself, cuts the food leaving the chute, in particular into slices, before that food reaches the pressing screw. This cutting tool is rotated around itself by a first shaft that is coaxial to but independent from a second shaft ensuring the rotational driving of the pressing screw around itself. The first shaft is directly coupled to the driving output of an electric motor, while the second shaft is also coupled to the driving output of that motor, but with a deceleration component inserted: the pressing screw is thus rotated x times less quickly than the cutting tool, with the aim of withdrawing the food introduced into the appliance in small slices that supply the inlet of the pressing screw. One then arrives at the same situation involving saturation risk situation as that cited above, this risk of saturation being more or less pronounced depending on the nature of the inserted food. The considered appliance therefore is also not satisfactory for all possible types of food.

It will be understood that to bypass this issue, the user may make sure only to introduce a small quantity of food at a time into the appliance and wait for it to be fully pressed before inserting a new small quantity. Such an approach is, however, unthinkable in the field of professional appliances.

SUMMARY OF THE INVENTION

The aim of the present invention is to propose a new appliance of the type described above, which, while making it possible to fragment food before pressing it by screw, is high performing and practical for a wide variety of foods, in particular to meet the requirements of the professional market.

To that end, the invention relates to an electrical appliance for preparing juice by pressing foods, including:
- a chute for taking in food toward the bottom;
- a screw for processing foods leaving the chute, said screw being centered on an axis and including:
  - an upper stage that is provided with a sweeper suitable for acting at an outlet of the chute on the foods leaving the chute to fragment them, and
  - a lower stage, which is separate from the upper stage of the screw and which is designed to drive and press the fragments of food downward coming from the upper stage of the screw;
- a chamber for receiving the screw, this chamber being substantially centered on the axis and including:
  - an upper part that is connected to the outlet of the chute to receive the foods leaving the chute and that surrounds the upper stage of the screw, and
  - a lower part, which surrounds the lower stage of the screw and is designed to separate the juice from the food fragments when the latter are pressed by the lower stage of the screw; and
- a driving system for driving the screw, which includes at least one electric motor, which is designed for driving the upper stage of the screw around the axis, relative to the chamber, at a first speed and in a first direction adjustably and independently of the lower stage, and which is designed for driving the lower stage of the screw around the axis, relative to the chamber, at a second speed and in a second direction adjustably and independently of the upper stage, the first speed being different from the second speed and/or the first direction being different from the second direction.

One of the ideas at the base of the invention is to control the action of the screw on the foods to be processed by separating this screw into at least two stages, i.e., an upper stage whose function is to fragment the food at the outlet of the intake chute, and a lower stage whose function is to press the food fragments, while providing for the ability to drive each of these two stages at different respective speeds and/or in different respective directions, adjustably and independently of the other stage. Thus, one typical operating scenario consists of driving the lower stage of the screw several times faster than its upper stage, if applicable in opposite respective directions: it will be understood that the lower stage of the screw performs several rotations around itself while the upper stage performs only one, such that the quantity of food that can be processed by the lower stage of the screw is tenfold compared to the quantity that would only be processed by a single rotation of this lower stage. More generally, the appliance according to the invention allows effective processing of quite varied foods, in particular a wide array of fruits and vegetables: depending on whether the foods to be processed are more or less hard, more or less juicy, more or less fibrous, with or without seeds, with or without skin, etc., and depending on the geometric shape and the dimensions of the processed foods, the speed of the upper stage and that of the lower stage can, during use, each be adapted independently of one another and/or the rotation direction of the upper stage and that of the lower stage can, during use, each be adapted, independently of one another, so as to control both the fragmenting action of the foods by the upper stage and the pressing action of the food fragments by the lower stage. In particular, the invention makes it possible to prevent the lower part of the chamber from being saturated by a quantity of food fragments coming from its upper part that is excessive to be effectively pressed by the lower stage of the screw; likewise, the invention makes it possible to avoid a low-performing under-supply of the lower part of the chamber. In other words, while effectively pressing food fragments to withdraw a maximum quantity of juice therefrom having excellent nutritional, gustatory and organoleptic properties, the appliance according to the invention meets the requirements of the professional market by making it possible to optimally adapt the fragmentation of the food to be pressed, owing to the rotational driving capacities, independently of one another, that are respectively specific to the two separate stages of the screw. In practice, the motorized system for driving the two stages of the screw can have varied shapes, which are more or less sophisticated.

According to additional advantageous features of the appliance according to the invention:

The driving system includes first and second electric motors that are separate from one another, a driving output of the first motor being coupled to the upper stage of the screw, while a driving output of the second motor is coupled to the lower stage of the screw;

The driving system further includes first and second coupling mechanisms that are separate from one another, the first coupling mechanism rotatably coupling the driving output of the first motor with the upper stage of the screw while the second coupling mechanism rotatably couples the driving output of the second motor with the lower stage of the screw;

Each coupling mechanism comprises:
  a rotating part, which is centered on the axis and which is secured to the stage of the screw with which the coupling mechanism is associated, and
  a transmission member, which outwardly surrounds the rotating part of the coupling mechanism so as to be able to rotate this rotating part around itself, and which is set in motion by the driving output of the motor with which the coupling mechanism is associated;

An upper end of the upper stage of the screw forms a ring, which is centered on the axis, from which the sweeper extends downward, through the inside of which the outlet of the chute is connected to the upper part of the chamber, and which connects the rest of the upper stage of the screw to the driving system;

The rotating part of the first coupling mechanism is secured to the ring of the upper stage of the screw;

The rotating part of the first coupling mechanism is annular and is arranged in the upward extension of the ring;

The appliance further includes a conduit for discharging pressing residues, which is connected to the lower end of the lower part of the chamber, and wherein the lower end of the lower stage of the screw is provided with a peripheral lip, which is substantially complementary to the inner face of the lower end of the lower part of the chamber and which is suitable, under the action of the pressing residues driven by the lower stage of the screw, for moving elastically away from the inner face of the lower end of the lower part of the chamber so as to allow these pressing residues to pass from the lower part of the chamber to the discharge conduit;

The lip is provided with arrangements for adjusting resistance to the pressing residues passing between the lip and the inner face of the lower end of the lower part of the chamber;

The discharge conduit extends the lower end of the lower part of the chamber downward and is provided with a rotating sweeping device, which is rotated around the axis by the driving system and which sweeps an outlet of a passage that is formed between the inner face of the lower end of the lower part of the chamber and the lip when the lip is deformed;

The outlet of the chute is inwardly centered on the axis;

The chute is entirely inwardly centered on the axis;

The sweeper comprises or consists of an edge defined by the upper stage of the screw, which is configured to crush the foods;

The chute geometrically defines an inscribed sphere able to pass freely through the chute, and wherein the upper part of the chamber is inwardly provided with blocking features suitable for blocking the rotation of the foods when the latter are in contact with the sweeper, such that, at the outlet of the chute, said inscribed sphere is movable inside the upper part of the chamber, to a fragmentation position in which:

by formation of a first contact zone between the inscribed sphere and the blocking features, the blocking features oppose the rolling of the inscribed sphere in a rotation direction of the upper stage of the screw, against the inner face of the upper part of the chamber, by formation of a second contact zone between the inscribed sphere and the blocking features, the blocking features oppose the rolling of the inscribed sphere in a rotation direction of the upper stage of the screw, against the inner face of the upper part of the chamber, this second contact zone being formed in half of the inscribed sphere, which is turned opposite the axis and which is defined by a diametric plane of the inscribed sphere, both substantially parallel to the axis and passing through the first contact zone, by formation of a third contact zone between the inscribed sphere and the sweeper, the sweeper crushes the inscribed sphere in the direction of the rotation of the upper stage of the screw, this third contact zone being formed in the half of the inscribed sphere opposite that in which the second contact zone is formed.

BRIEF DESCRIPTION OF THE DRAWINGS

The invention will be better understood upon reading the following description, provided solely as an example and done in reference to the drawings, in which.

DESCRIPTION OF THE INVENTION

FIGS. 1 to 11 show an appliance 1 making it possible to prepare juices from foods, in particular fruits and vegetables, by pressing these foods.

The appliance 1 comprises a food processing screw 10, in particular for pressing these foods, which is shown alone in FIGS. 6 to 9 and which is visible, within the appliance 1, in FIGS. 2 to 4, 10 and 11. This screw 10 defines a central axis X-X. In practice, when the appliance 1 is used, the appliance rests on a table, or more generally, on a substantially horizontal work surface such that the axis X-X is vertical or substantially vertical: under these conditions, for convenience, the present document is oriented relative to the axis X-X, the terms "top" and "upper" corresponding to a direction which, in the axis X-X, is turned upward, i.e., away from the work surface on which the appliance 1 rests. The terms "lower" and "bottom" correspond to an axial direction in the opposite sense.

As clearly shown in FIGS. 2 to 4 and 6 to 9, the screw 10 includes, successively in the direction of the axis X-X, an upper stage 11 and a lower stage 12. The upper stage 11 comprises a main body 110 which, in the example embodiment considered in the figures, has an overall helical shape winding substantially around the axis X-X. The lower stage 12 includes a main body 120 which, in the example considered here, is globally bullet-shaped and centered on the axis X-X. Irrespective of the embodiment of the upper 11 and lower 12 stages, in particular of their main body 110 and 120, the upper 11 and lower 12 stages are made in the form of two separate parts which, in the assembled state of the screw 10, in particular when the appliance 1 is in use, are aligned with one another in the direction of the axis X-X, the lower end of the upper stage 11 being end-to-end with the upper end of the lower stage 12.

Within the appliance 1, each of the upper 11 and lower 12 stages of the screw 10 can be rotated around itself around the axis X-X, without these upper 11 and lower 12 stages being rotatably connected to one another at their abutting interface: in other words, when the screw 10 is considered alone, each of the upper 11 and lower 12 stages can be rotated around itself around the axis X-X independently of the other stage, both regarding the rotation speed and the rotation direction of each of these stages. In practice, at their abutting interface, the upper 11 and lower 12 stages are, as in the example considered here, in direct contact with one another, this contact being provided sliding freely in rotation around the axis X-X, with the understanding that, as an alternative that is not shown, a bearing or a similar member can be inserted between the two stages. In all cases, the upper 11 and lower 12 stages are disconnected from one another at their abutting interface.

Figure 6:
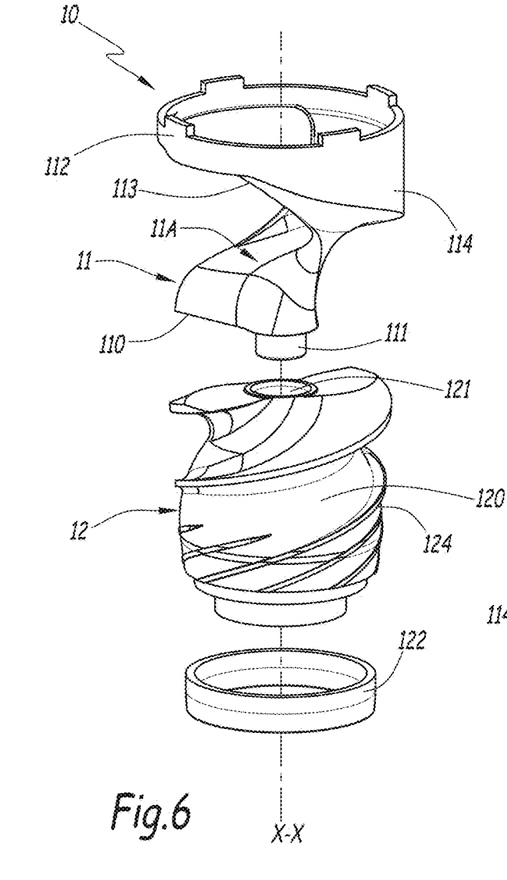
FIGS. 6 and 7 are exploded perspective views of a screw of the appliance.
Figure 7:
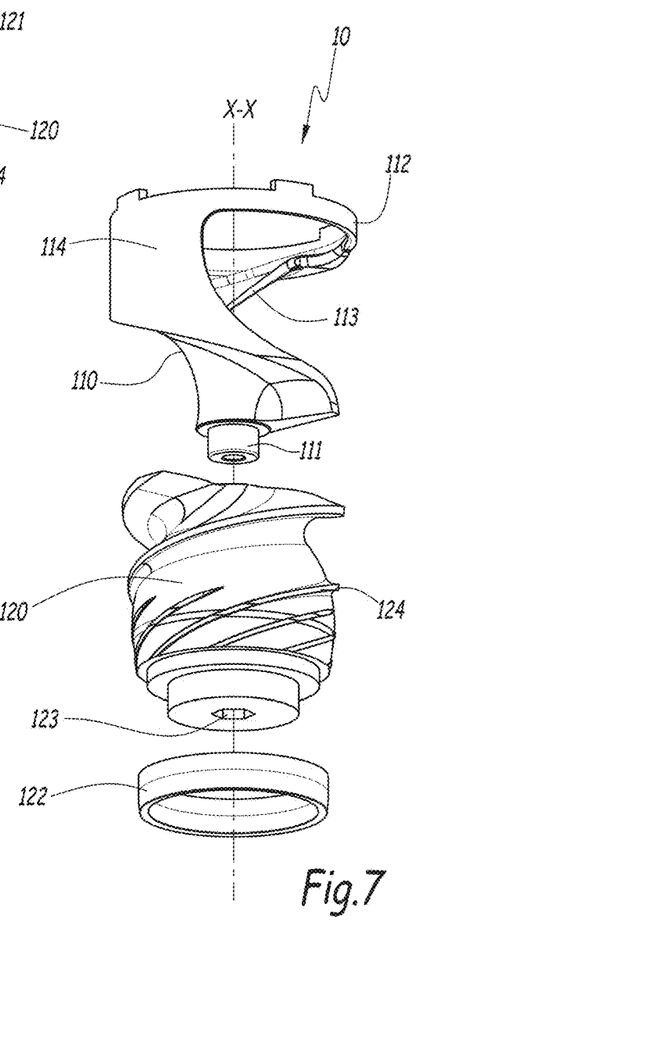
Figure 9:
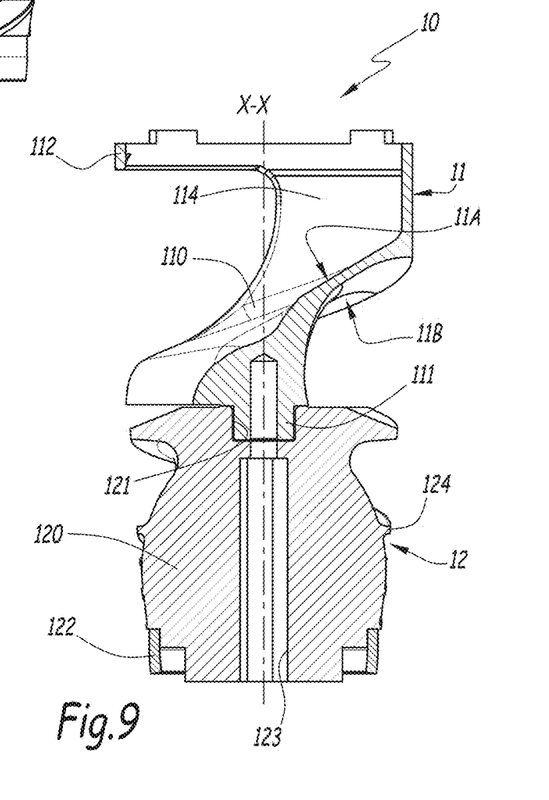
FIG. 9 is a sectional view along line IX-IX of FIG. 8.

According to one option seeking to strengthen the alignment of the upper 11 and lower 12 stages on the axis X-X in the assembled state of the screw 10, a protruding relief 111 from the lower end of the upper stage 11, having a circular profile centered on the axis X-X, is received in a complementary cavity 121 defined by the upper end of the lower stage 12, as clearly shown in FIGS. 6, 7 and 9: this relief 111 and this cavity 121, more generally ad hoc arrangements of the respective abutting ends of the upper 11 and lower 12 stages of the screw 10, cooperate by shape matching to make the upper 11 and lower 12 stages coaxial, while retaining their rotating disconnection around the axis X-X.

At its upper end, the upper stage 11 is configured in a ring 112, which is centered on the axis X-X while running uninterrupted around this entire axis X-X and from which the helical body 110 extends downward. The interest of this ring 112 will appear later.

Figure 8:
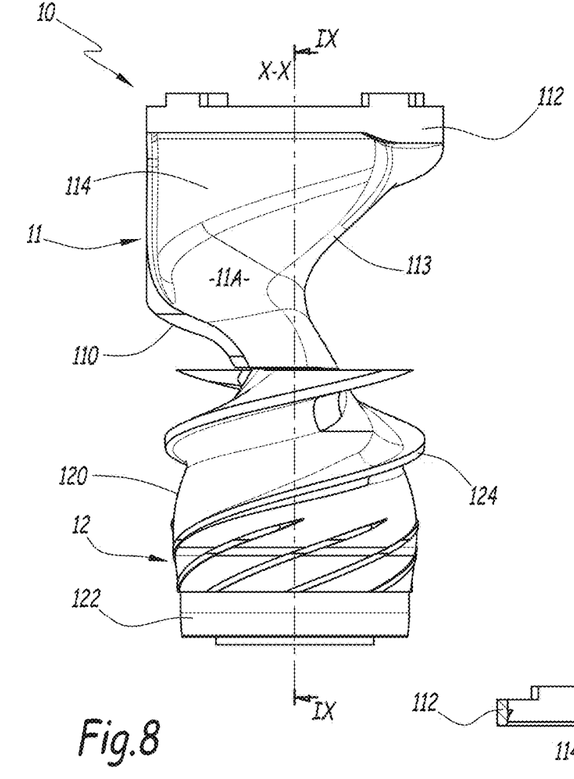
FIG. 8 is an elevation view of the screw of FIGS. 6 and 7, in the assembled state.

Likewise, for reasons specified below, the lower end of the lower stage 12 is provided with a peripheral lip 122, centered on the axis X-X and running uninterrupted around that entire axis. As clearly shown in FIGS. 6 and 7, in the example embodiment considered here, the lip 122 is made in the form of a separate part from the bullet-shaped body 120 of the lower stage 12, the lip being attached to the lower end of this body 120 such that their respective end faces extend globally in the extension of one another, as shown in FIGS. 8 and 9. According to one practical embodiment, the lip 122 is fixedly secured to the body 120, using any appropriate means, the lip 122 thus being rotatably connected around the axis X-X with the rest of the lower stage 12.

Other features of the screw 10, in particular of its upper 11 and lower 12 stages, will be described later, in connection with other components of the appliance 1.

The appliance 1 further includes a chamber 20 inside which the screw 10 is received such that the upper 11 and lower 12 stages of the screw can be rotated around themselves around the axis X-X relative to this chamber 20. In practice, the chamber 20 is stationary relative to the work surface on which the appliance 1 rests when the latter is used. Furthermore, in a manner not shown in detail in the figures, the chamber 20 is, within the appliance 1, potentially secured to an outer frame of this appliance, this aspect not being limiting with respect to the invention.

Figure 3:
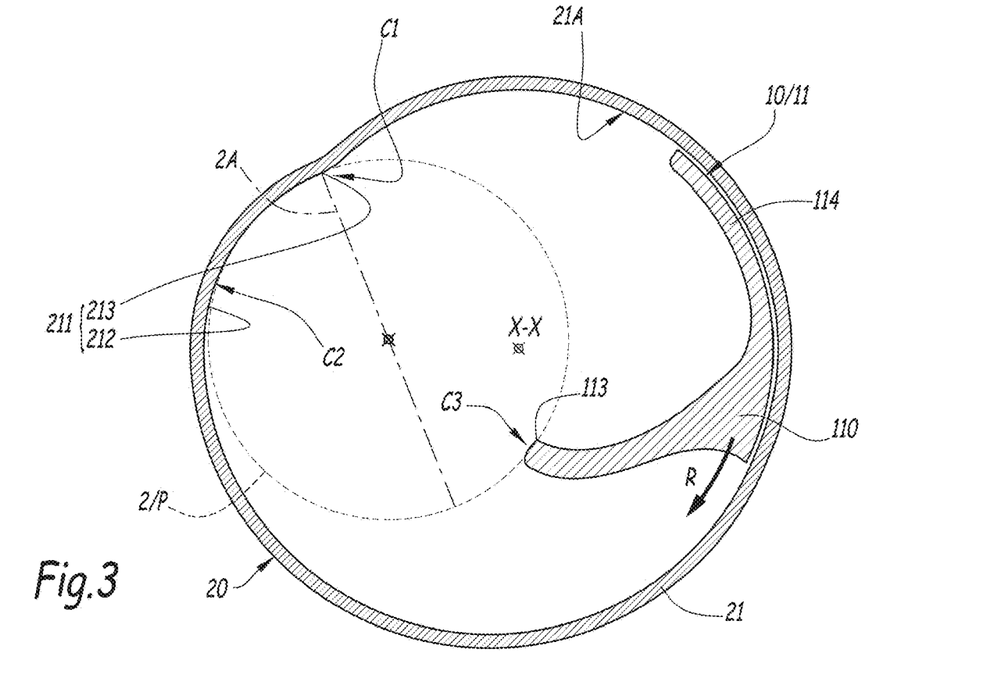
FIGS. 3 and 4 are sectional views in planes III and IV of FIG. 2.
Figure 4:
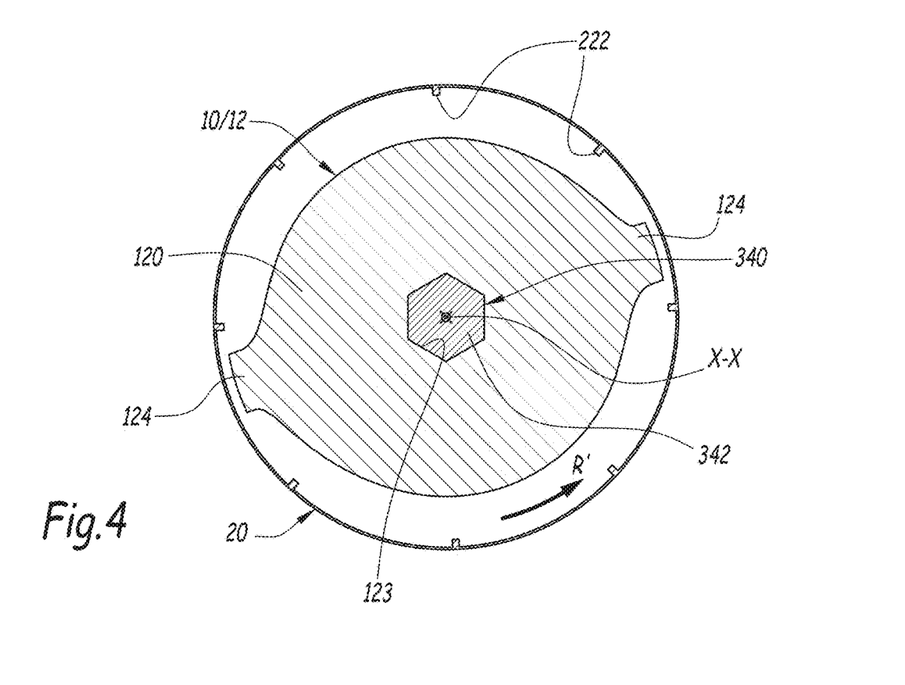
Figure 5:
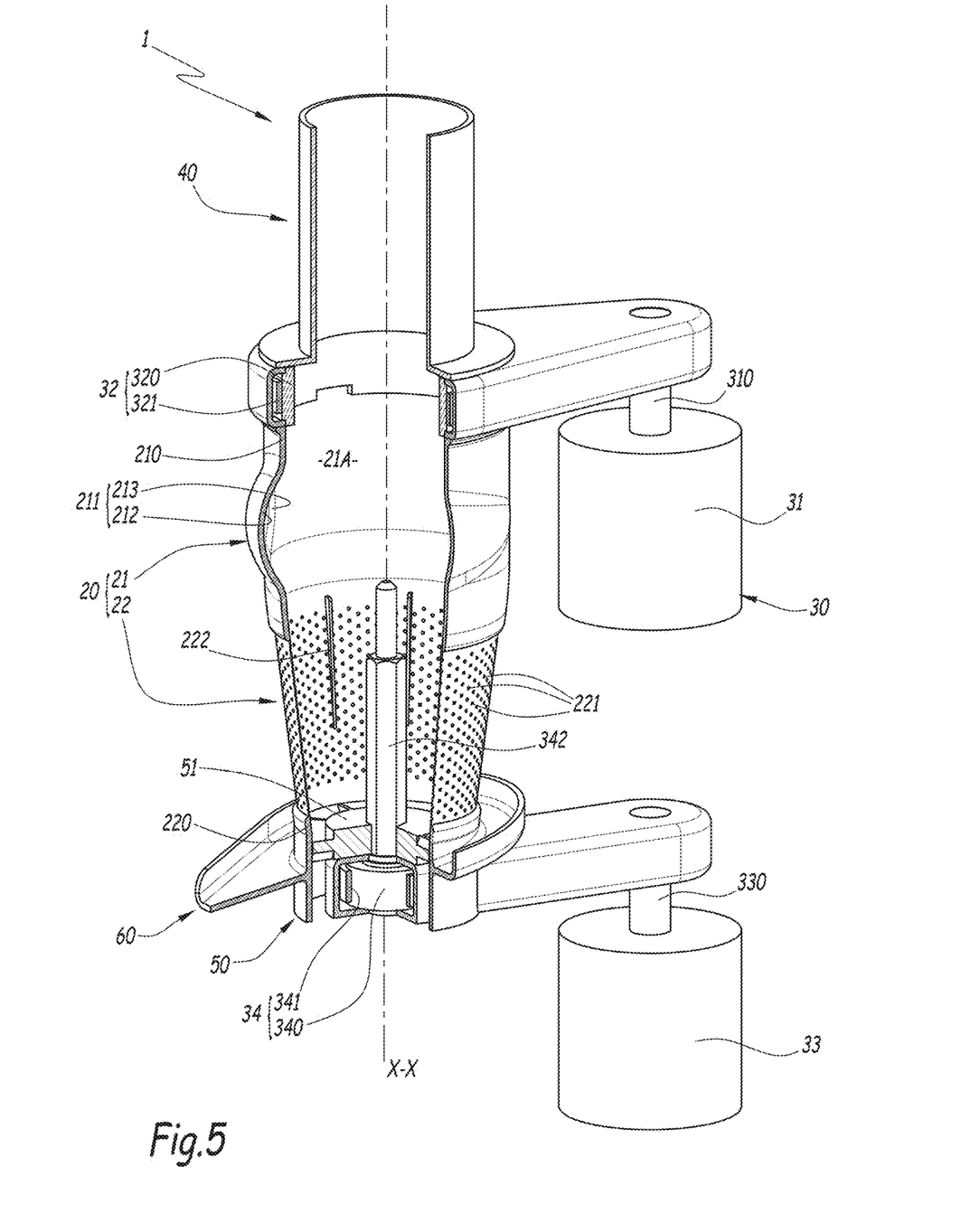
FIG. 5 is a perspective view, with partial sectional view, of only part of the appliance.

The chamber 20 is centered on a geometric axis in the direction where it defines an inner volume which, as clearly shown in FIGS. 2 to 4, 10 and 11, inwardly receives the screw 10 such that its aforementioned axis is substantially combined with the axis X-X of the screw. Furthermore, for simplification, the aforementioned axis of the chamber 20 is subsequently considered to be the axis X-X, as shown in FIG. 5.

In the embodiment considered in the figures, the chamber 20 includes, successively in the direction of the axis X-X, both:

an upper part 21, which has a globally tubular shape, centered on the axis X-X, and which surrounds the upper stage 11 of the screw 10, while running all the way around the outside of this upper stage 11 and extending axially radially opposite this upper stage 11, and a lower part 22, which has a globally frustoconical shape, centered on the axis X-X and converging downward, and which surrounds the lower stage 12 of the screw 10, while running all the way around the outside of this lower stage 12 and extending axially radially opposite this lower stage 12.

Figure 2:
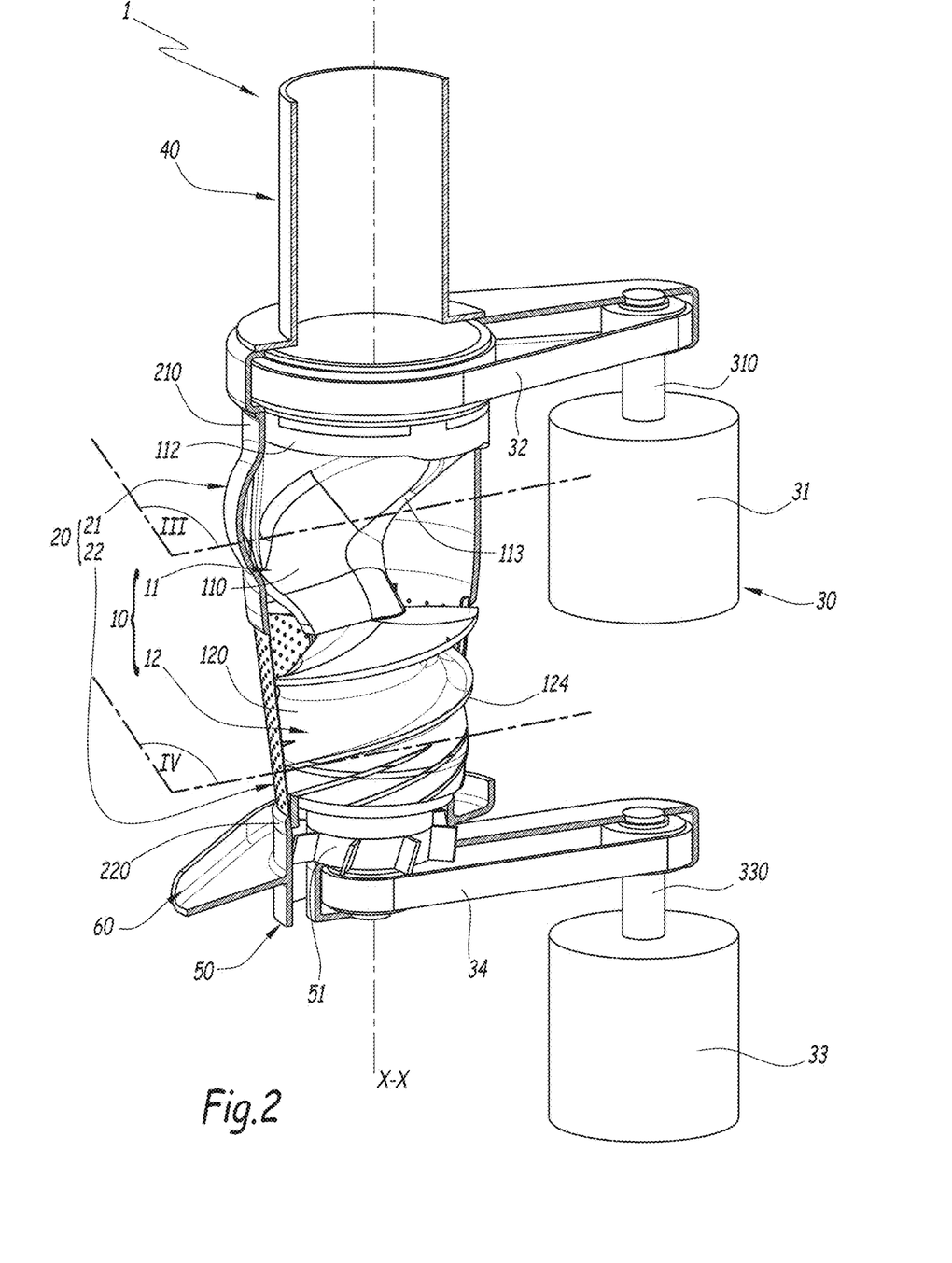
FIG. 2 is a perspective view of the appliance of FIG. 1, with partial sectional view.

As clearly shown in FIG. 2, the upper part 21 of the chamber 20 has an upper end 210 that surrounds the ring 112 forming the upper end of the upper stage 11 of the screw 10, while running all the way around this ring 112 and extending axially radially opposite this ring 112. This upper end 210 of the chamber receives the ring 112 in a substantially complementary manner, thus centering the chamber 20 on the axis X-X.

Also as shown in FIG. 2, the lower part 22 of the chamber 20 has a lower end 220 situated at the axial level of the lower end of the lower stage 12 of the screw 10. This lower end 220 of the chamber 20 surrounds the lip 122 of the lower stage of the screw 10, while running all the way around the outside of this lip 122 and receiving this lip 122 in a substantially complementary manner. In other words, the lip 122 is provided to be substantially complementary to the lower face of the lower end 220 of the lower part 22 of the chamber.

Other features of the chamber 20, in particular of its upper 21 and lower 22 parts, will be described later, in connection with the rest of the appliance 1.

The appliance 1 also includes a driving system 30 making it possible to drive the upper 11 and lower 12 stages of the screw 10 around the axis X-X relative to this chamber 20.

In the example embodiment considered here, the driving system 30 includes, for the purposes of driving the upper stage 11 of the screw 10, an electric motor 31 and a coupling mechanism 32 between the driving output 310 of the motor 31 and the upper stage 11 of the screw 10, clearly shown in FIGS. 2 and 5.

The electric motor 31 belongs to technology known in itself, and its embodiment is not limiting with respect to the invention, this motor 31 also only being shown diagrammatically in the figures. Of course, the motor 31 is associated with control members, which make it possible to turn the motor on and off, as well as, advantageously, to adjust the speed and/or direction of its driving output 310. In practice, the motor 31 is advantageously incorporated inside the aforementioned frame of the appliance 1, its control members being supported by the outer face of this frame so that they may be actuated by the user.

As clearly shown in FIG. 5, the coupling mechanism 32 comprises a rotating part 320, which is centered on the axis X-X and which is rotated around itself by a cable, a belt or a similar member 321, outwardly cinching the rotating part 320 and set in motion by the driving output 310 of the motor 31. The rotating part 320 may have quite varied embodiments and for example consists of a crown, a gear, a drum, etc. Irrespective of its embodiment, the rotating part 320 is rotatably connected to the upper stage 11 of the screw 10, while being secured to this upper stage 11 by any appropriate means, advantageously removably, to allow, when the appliance 1 is not in use, the disassembly between the rotating part 320 and the upper stage 11 of the screw 10, and thus to facilitate cleaning.

According to one particularly advantageous aspect, which is implemented in the appliance 1 considered in the figures, the rotating part 320 of the coupling mechanism 32 is designed to be secured to the ring 112 of the upper end of the upper stage 11 of the screw 10, such that this ring 112 connects the rest of the upper stage 11 to the coupling mechanism 32. In the example embodiment considered here, the rotating part 320 thus has a globally annular shape and, when the appliance 1 is in use, is arranged in the upward extension of the ring 112, while being rotatably connected to this ring 112, for example by shape matching between the upper and lower edges, respectively, of the ring 112 and the rotating part 320. Due to its presence at the upper end of the upper stage 11 of the screw 10, the rotating part 320 substantially rigidifies this upper end of the upper stage 11, which amounts to saying that the rotating part 320 firmly fixes the axis X-X of the screw 10 in position in the appliance 1, by reacting the radial forces applied to the upper stage 11 of the screw 10 during its rotation, without these radial forces being reacted, at the very least substantially, at the centering interface between the ring 112 forming the upper end of the upper stage 11 of the screw 10 and the upper end 210 of the upper part 21 of the chamber 20.

Furthermore, as clearly visible in FIGS. 2 and 5, the driving system 30 further includes an electric motor 33 and a coupling mechanism 34, provided to drive the lower stage 12 of the screw 10 in rotation around the axis X-X. As for the motor 31, the motor 33 belongs to technology known in itself, non-limiting with respect to the invention, and is associated with control members allowing it to be started-stopped as well as, advantageously, making it possible to adjust the speed and/or rotation direction of its driving output 330. According to practical considerations similar to those mentioned above for the motor 31, the motor 33 is advantageously integrated inside the frame of the appliance 1.

It will be noted that, in the example embodiment considered in the figures, the electric motors 31 and 33 are separate from one another, in that their driving outputs 310 and 330 are independent of one another, in particular regarding their speed and/or rotation direction.

The coupling mechanism 34 is designed to couple the driving output 330 of the motor 33 with the lower stage 12 of the screw 10 to rotate this stage around the axis X-X. According to considerations similar to those mentioned above for the coupling mechanism 32, the coupling mechanism 34 comprises a rotating part 340 which, on the one hand, is connected in rotation to the lower stage of the screw 10, while being secured to this lower stage 12 by any appropriate means and advantageously removably, and which, on the other hand, is rotated around itself around the axis X-X by a transmission member 341, such as a cable or a belt, outwardly cinching the rotating part 340 and set in motion by the driving output 330 of the motor 33. In the example embodiment considered in the figures, the rotating part 340 includes, as shown in FIGS. 4 and 5, a shaft 342 with a noncircular profile, which, when the appliance 1 is in use, is received, coaxially and in an adjusted manner, in a bore 123 of the lower stage 12 of the screw 10, hollowed out centered on the axis X-X from the lower end of this lower stage 12.

It will be noted that, in the example embodiment considered in the figures, the coupling mechanisms 32 and 34 are separate in the sense that the rotational coupling, provided by the mechanism 32 between the driving output 310 of the motor 31 and the upper stage 11 of the screw 10, is independent of the rotational coupling provided by the mechanism 34 between the driving output 330 of the motor 33 and the lower stage 12 of the screw 10. Furthermore, in the extension of the preceding considerations, it will be emphasized that the rod, which coaxially outwardly extends the shaft 342, has a circular profile and, when the appliance 1 is in use, is received in complementary circular bores, respectively defined by the upper 11 and lower 12 stages of the screw 10, exclusively for alignment purposes of these stages on the axis X-X, in particular without there being any transmission of rotational movements between the coupling mechanism 34 and the upper stage 11 of the screw 10.

Through the design of the driving system 30, the upper stage 11 of the screw 10 can be driven, by the motor 31 and the coupling mechanism 32, in rotation around the axis X-X at a speed and/or in a direction that are different from the speed and/or the direction by which the lower stage 12 of the screw can be rotated around the axis X-X by the motor 33 and the coupling mechanism 34, this driving of the upper 11 and lower 12 stages at different respective speeds and/or in different respective directions being ensured independently between the two stages, due to the fact that the motor 31 and the coupling mechanism 32 are separate from the motor 33 and the coupling mechanism 34. Furthermore, owing to the adjustment capacity of each of the motors 31 and 33, the rotational driving of each of the upper 11 and lower 12 stages of the screw 10 is adjustable regarding the speed and/or the rotation direction.

Figure 1:
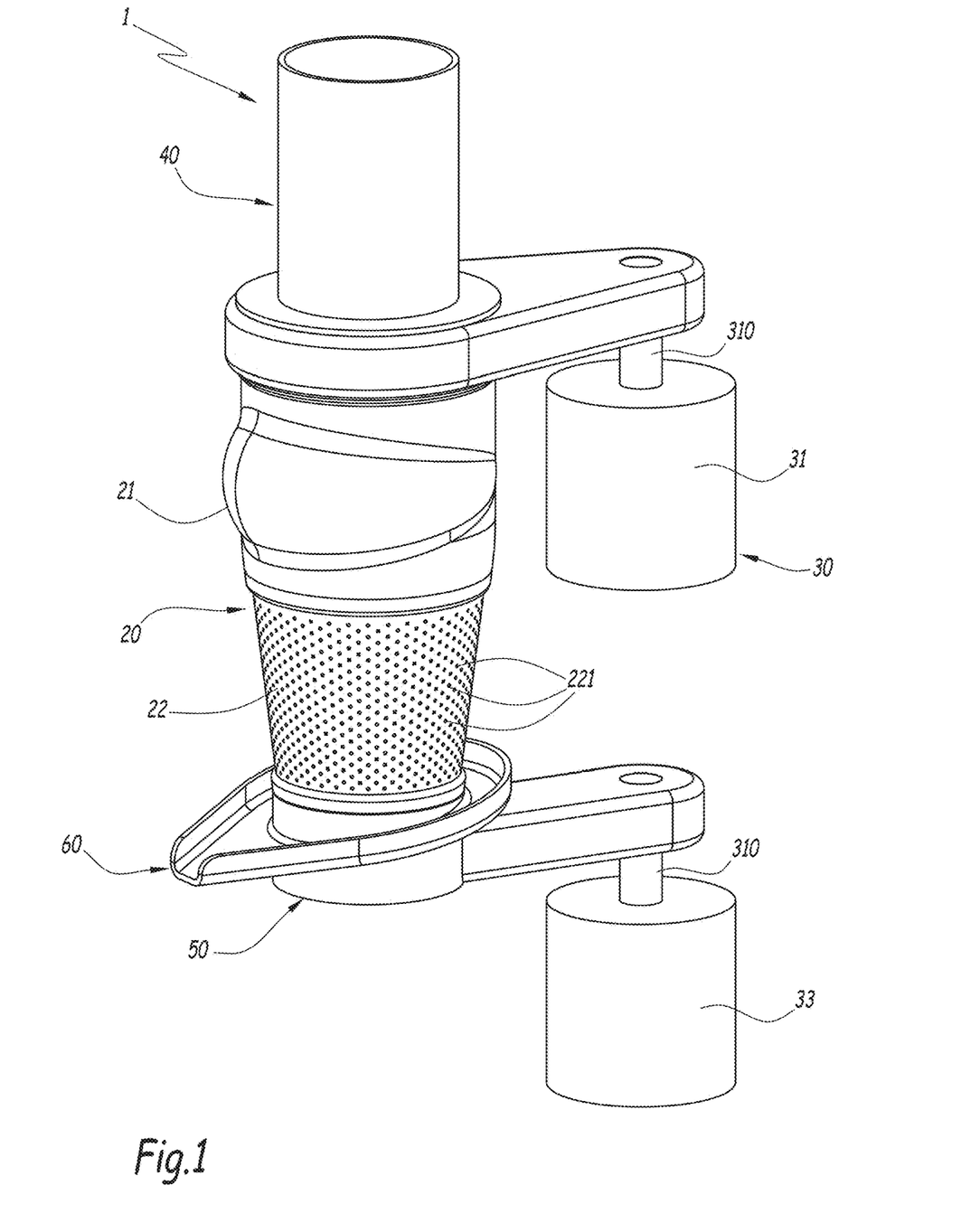
FIG. 1 is a perspective view of an appliance according to the invention.

As shown in FIGS. 1, 2 and 5, the appliance 1 also includes a chute 40 by which the foods are inserted that are to be processed inside the chamber 20 by the screw 10.

In the example embodiment considered here, the chute 40 assumes a globally tubular shape, centered on the axis X-X. Other embodiments can be considered for the chute 40, inasmuch as the downward outlet of this chute 40 is connected to the upper part 21 of the chamber 20 so that the foods inserted into the chute reach this upper part of the chamber.

Figures 10, 11:
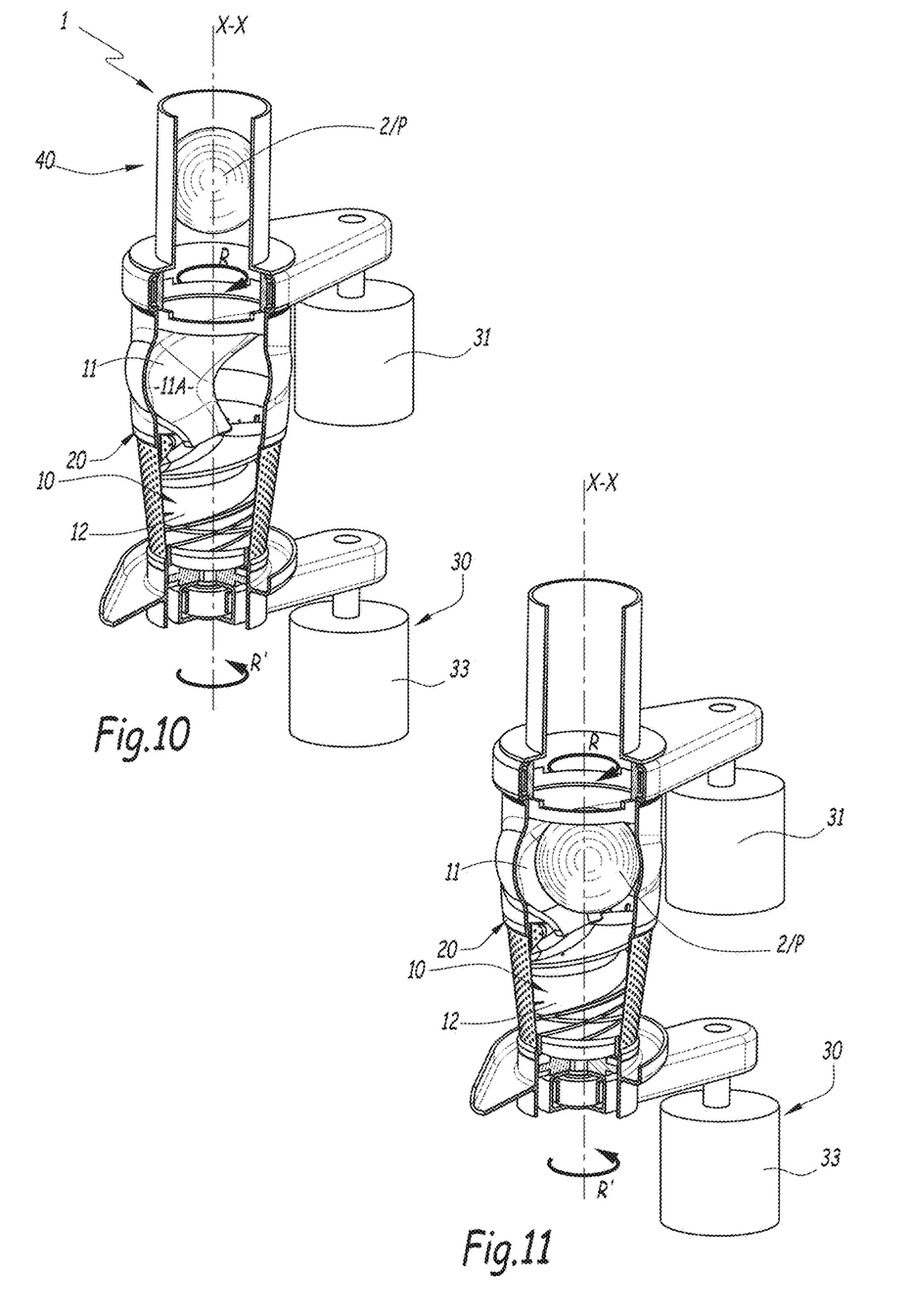
FIGS. 10 and 11 are perspective views of the appliance of FIG. 1, with partial sectional view, which respectively illustrate two different positions of a sphere taken into the appliance.

In all cases, the chute 40 geometrically defines an inscribed sphere 2, which is drawn in FIGS. 10 and 11 and appears in dotted lines in FIG. 3: this sphere 2 is the largest sphere that can be inserted into the chute 40 and reach the outlet thereof without being blocked in the chute. In other words, as clearly shown in FIG. 10, the inscribed sphere 2 is a fictitious three-dimensional geometric object, consisting of the "largest ball" that can reach, without being blocked, i.e., without interference completely stopping the movement, the outlet of the chute 40 from the outside of the appliance 1 via the inside of the chute. It will be understood that this inscribed sphere 2 simulates the largest spherical food that can be inserted whole into the appliance 1 in order to obtain juice. As a non-limiting example, the inner diameter of the chute 40 is about 80 millimeters, which means that the inscribed sphere has a diameter of the same value.

In practice, the chute 40 is stationary within the appliance 1, while being secured, directly or indirectly, to the chamber 20, the downward outlet of the chute 40 overhanging the upper stage 11 of the screw 10. In the example embodiment considered in the figures, the lower end of the chute 40 is secured to the upper end 210 of the upper part 21 of the chamber 20 via a stationary assembly part, at the axial level of which the rotating part 320 of the coupling mechanism 32 is arranged. This assembly part for example belongs to the aforementioned frame of the appliance 1. As an alternative that is not shown, this assembly part is made in the form of an upward extension of the chamber 20 or a downward extension of the chute 40.

Optionally, not shown in the figures, the chute 40 is provided with a pusher that may be particularly useful if certain foods become blocked.

The downward outlet of the chute 40 is connected to the inner volume of the upper part 21 of the chamber 20, via the ring 112 formed by the upper end of the upper stage 11 of the screw 10, as well as by the inside of the rotating part 320 of the coupling mechanism 32, provided accordingly to cross axially all the way through. The inner diameter of the ring 112, as well as that of the rotating part 320, are at least equal to, or even slightly larger than the diameter of the inscribed sphere 2, such that this sphere passes freely, i.e., without blocking interference, from the outlet of the trough 40 to the inside of the upper part 21 of the chamber 20, as shown in FIG. 11.

At the axial level of the upper stage 11 of the screw 10 and the upper part 21 of the chamber 20, it is provided to process the foods for their subsequent pressing, described later in detail, at the lower stage 12 of the screw 10, and the lower part 22 of the chamber 20.

To that end, in the embodiment considered in the figures, the upper stage 11 of the screw 10 defines a surface 11A turned upward, to guide the foods from the inside of the ring 11 forming the upper end of this upper stage 11 to the outside of the lower stage 12 of the screw: as clearly shown in FIGS. 8 and 9, this guide surface 11A is helical, winding substantially around the axis X-X and connecting the inner face of the ring 112 to the outer face of the lower stage 12 of the screw. As shown in FIGS. 10 and 11, the guide surface 11A is provided, in particular due to its incline, to allow the inscribed sphere 2 to be movable downward from the inside of the ring 12, following a globally helical trajectory resulting from the rolling and/or sliding of this sphere on the guiding surface 11A to the inside of the upper part 21 of the chamber 20.

Furthermore, the upper stage 11 of the screw 10 is designed to sweep the outlet of the chute 40 so as, inside the upper part 21 of the chamber 20, to fragment the foods leaving the chute, before the food fragments reach the lower part 22 of the chamber. The corresponding sweeper, with which the upper stage 11 of the screw 10 is provided, preferably consists of shape arrangements of the main body 110 of this stage 11: in the example embodiment considered in the figures, this sweeper comprises an edge 113 for crushing foods, defined by the body 110. This crushing edge 113 extends downward from the ring 112, while being turned toward the axis X-X and winding in a spiral around this axis, to the lower stage 12 of the screw 10, as clearly shown in FIGS. 2, 3, 6 and 8. For reasons that will appear later, the edge 113 does not need to be sharp or cutting, inasmuch as, when it acts on the foods to fragment them, it is not designed to cut them by clean division of the material of the food on either side of the edge, but this edge 113 is designed, due to its shape, to crush the food until it breaks the material of the latter by tearing and/or pulling.

In order for the action of the edge 113, or more generally, the sweeper on the foods to be high-performing for their fragmentation, the upper part 21 of the chamber 20 is inwardly provided with blocking features 211 that block the rotation of the foods when the latter are in contact with the edge 113 or, more generally, the aforementioned sweeper. As shown in FIGS. 3 and 5, these blocking features 211 preferably consist of shape arrangements of the inner face 21A of the upper part 21 of the chamber 20. In the example embodiment considered here, these shape developments comprise a surface 212 defined hollowed out in the inner face 21A of the upper part 21 of the chamber 20, as well as a junction edge 213 between the surface 212 and the rest of the inner face 21A.

The crushing edge 113, the hollow surface 212 and the edge 213, i.e., more generally the sweeper provided at the upper stage 11 of the screw 10 and the blocking features 211 provided in the upper part 21 of the chamber 20, are arranged and sized in connection with the inscribed sphere 2, inasmuch as, inside the upper part 21 of the chamber, this inscribed sphere 2 is movable to a fragmenting position, imposed on the inscribed sphere by these sweeper and these blocking features, this movement of the sphere 2 to this fragmenting position advantageously being guided inside the upper part 21 of the chamber by the guiding surface 11A as previously indicated. More specifically, when the inscribed sphere 2 occupies the aforementioned fragmenting position, which is shown in solid lines in FIG. 11 and dotted lines in FIG. 3, several contact zones are formed between the inscribed sphere on the one hand, and the edge 113 of the sweeper and the shape arrangements of the inner face 21A that constitute the blocking features 211 on the other hand, namely:

- a first contact zone C1 between the inscribed sphere 2 and the edge 213 such that, by acting on the sphere via this contact zone C1, the edge 213 opposes the rolling of the sphere in a direction R, indicated in FIG. 3, of the rotation of the upper stage 11 of the screw 10, against the inner face 21A of the upper part 21 of the chamber 20,
- a second zone C2 between the inscribed sphere 2 and a bottom region of the hollow surface 212, such that, by acting on the sphere by this second contact zone C2, this bottom region of the hollow surface 212 opposes the rolling of the sphere in the direction opposite the rotation direction R, against the inner face 21A, the second contact zone C2 being formed in the half of the sphere that is turned opposite the axis X-X and that is defined by a diametric plane, denoted 2A in FIG. 3, of the sphere, both parallel to the axis X-X and passing through the first contact zone C1, and
- a third contact zone C3 between the inscribed sphere 2 and the crushing edge 113 such that, by acting on the sphere via this third contact zone C3 during the rotation of the upper stage 11 in the direction R, the crushing edge 113 crushes the sphere, this contact zone C3 being formed in the half of the sphere opposite that in which the second contact zone C2 is formed.

It will be noted that, for illustrative reasons, the contact zones C1, C2 and C3 have been indicated in the section plane of FIG. 3, whereas, in practice, the respective axial levels of these contact zones C1, C2 and C3 can be different from one another. Irrespective of their axial level, the three contact zones C1, C2 and C3 make it possible, during the rotation of the upper stage 11 of the screw 10 in the direction R, to apply, on the inscribed sphere 2, shear forces substantially in its diametric plane 2A: at the contact zone C1, the edge 213 forms an anti-rolling stop in the rotation direction R for the inscribed sphere 2, such that, at the contact zone C3, the crushing edge 113 is able to press on the half, turned toward the axis X-X, of the sphere 2 outside the diametric plane 2A of the latter, while preventing the sphere 2 from escaping the action of this crushing edge 113 by moving away from the axis X-X and/or rising upward, due to its blockage, at the contact zone C2, by the bottom region of the hollow surface 212, this bottom region thus forming an anti-escape stop for the sphere.

According to one additional arrangement implemented in the example embodiment considered here, the upper stage 11 of the screw 10 includes, in the outer periphery of its main body 110, a wall 114 which, as clearly shown in FIGS. 6 to 9, is globally in the shape of a half-tube, centered on the axis X-X, while bordering the outer periphery of the guide surface 11A. As clearly shown in FIG. 3, the outer face of this wall 114 is sized to be substantially complementary with the inner face 21A of the upper part 21 of the chamber 20, with the insertion of functional play so as not to introduce wear: this arrangement causes a scraping effect of the outer face of the wall 114 of the upper stage 11 of the screw 10 during the rotation of this upper stage 11, so as to avoid the accumulation of food residues.

At the axial level of the lower stage 12 of the screw 10 and the lower part 22 of the chamber 20, the foods fragments, coming from the upper stage 11 of the screw and the upper part 21 of the chamber, are provided to be pressed to extract the juice therefrom. To that end, the lower stage 12 of the screw is outwardly provided with threads 124, which, as clearly shown in FIGS. 4 and 6 to 9, wind downward over the entire axial height of the main body 120 of this lower stage 12. These threads 124 are designed so as, during the rotation of the lower stage 12, [to drive] downward, inside the lower part 22 of the chamber 20, the foods fragments that enter the lower part 22 of the chamber via a passage that is upwardly defined by the crushing edge 113, and is downwardly defined by the connecting zone between the guide surface 11A and the outer face of the lower stage 12. In their upper part, the threads 124 "catch" the fragments crossing the aforementioned passage, this catching being facilitated by providing, as an advantageous option shown in FIGS. 7 and 9, that the upper stage 11 of the screw 10 defines a helical surface 11B turned downward, so as, during the rotation of the upper stage 11 in the direction R, to push the food fragments downward. After having caught the food fragments, the threads 124 are designed, still when the lower stage 12 is rotated around the axis X-X, to press these food fragments against the frustoconical inner face of the lower part 22 of the chamber 20, as these food fragments are driven downward inside the lower part 22 of the chamber.

In turn, the lower part 22 of the chamber 20 is provided with through orifices 221 for sieving the food, by which the juice resulting from the pressing of the food fragments passes from the inside to the outside of the lower part 22. More generally, it is understood that the lower part 22 of the chamber 20 is designed to separate the juice from the food fragments when the latter are pressed by the lower stage 12 of the screw 10, this juice passing outside the lower part 23, while the pressed food residues remain inside this lower part 22. In practice, the lower part 22 of the chamber 20 includes or even consists of a sieve, preferably made from metal, typically made from a metal sheet perforated with orifices 221. This being the case, alternatively, this lower part 22 of the chamber can be made in several parts, from metal and/or another material.

As an advantageous option, in particular making it possible to improve the pressing of the food fragments, the lower part 22 of the chamber 20 is inwardly provided with ribs 222, protruding from the inner face of the lower part 22 and extending globally from top to bottom, for example parallel to the axis X-X, as clearly shown in FIGS. 4 and 5. These ribs 222 make it possible, in the lower part 22 of the chamber 20, to block the rotation of the food fragments when the latter are driven by the threads 124 of the lower stage 12 of the screw 10.

At the axial level of the lower end 220 of the lower part 22 of the chamber 20, the pressed food residues are retained inside this lower part 22 by the lip 122. This retention of the pressed food residues is complete as long as the lip 122 is tightly pressed against the inner face of the lower end 220 of the chamber 20. Yet the lip 122 is designed so as, under the action of a sufficient force, oriented toward the axis X-X, to deform elastically toward the axis X-X so as to move radially away from the inner face of the lower end 220 of the lower part 22 of the chamber, a passage between this lower face and the lip 22 then opening downward from the inside of the lower part 22 of the chamber. It is therefore understood that, under the action of the pressed food residues accumulating at the lower end 222 of the chamber 20, the lip 122 moves elastically away from the inner face of this lower end 222 so as to allow these residues to pass, from the lower part 22 of the chamber 20 to the outside of said chamber, more specifically below the lower end 222 of the chamber.

In the extension of the preceding considerations, one advantageous option consists of the lip 122 having arrangements making it possible to adjust the resistance to the passage of the food residues between the lip 122 and the inner face of the lower end 220 of the lower part 22 of the chamber 20. The embodiment of these developments is not limiting: as an example, these developments include a mechanism or member for reinforcing or reducing the flexibility of the skirt 122, in particular by acting on the inner wall of this lip.

The appliance 1 further includes a discharge conduit 50 for the pressed food residues. As shown in FIGS. 1, 2 and 5, this conduit 50 is connected to the lower end 220 of the lower part 22 of the chamber 20 that receives the residues leaving the passage defined between the inner face of this lower end 220 and the lip 122 when the latter is separated, by flexible deformation, from this inner face.

According to one optional provision, which is implemented in the example embodiment considered here and proves particularly effective to discharge the residues, in particular by limiting the resistance to the flow of these residues from the lower end 220 of the chamber 20, the discharge conduit 50 downwardly extends this lower end 220, while being inwardly provided with a rotating device 51 which, by rotational driving around the axis X-X, sweeps the outlet of the passage forming between the inner face of the lower end 220 of the chamber 20 and the lip 122 when the latter is deformed. It is understood that this device 51 frees any accumulated residues, which could for example adhere to the inner face of the conduit 50, in particular axially overhanging the part of the coupling mechanism 34 arranged through a part of the conduit 50. In practice, the rotating sweeping device 51 is advantageously rotated by the coupling mechanism 34 and the associated motor 33, for example while being engaged with the shaft 342, as clearly shown in FIG. 5.

Outwardly, the lower end 220 of the chamber 20 and/or the discharge conduits 50 are surrounded by a recovery tray or, more generally, by means 60 for collecting the juice coming from outside the lower part 22 of the chamber.

One example use of the appliance 1 will now be described, more specifically in light of FIGS. 3, 10 and 11, considering that a whole apple P is inserted into the appliance 1, the shape and dimensions of said apple being substantially identical to those of the inscribed sphere 2 considered above.

First, the appliance 1 is turned on, by turning on its motors 31 and 33. The upper 11 and lower 12 stages of the screw 10 are then set in rotation around themselves around the axis X-X. Based on the food to be processed, the user adjusts the respective rotation speeds and/or respective rotation directions of the upper 11 and lower 12 stages of the screw 10 independently for these two stages, these respective speeds being provided to be different from one another and/or these respective directions being provided to be different from one another. If the appliance 1 does not have the possibility of adjusting the respective driving of the upper 11 and lower 12 stages of the screw 10, a pre-adjustment ensures that the two stages 11 and 12 of the screw 10 have different respective rotation speeds and/or different respective rotation directions. As an example adapted to the processing of an apple P, the upper stage 11 of the screw 10 is driven in the rotation direction R indicated in the figures, with a speed of about 5 to 10 revolutions per minute, while the lower stage 12 is driven in a direction R' opposite the direction R, with a speed of about 70 to 80 revolutions per minute.

The apple P is admitted toward the bottom inside the chute 40 and descends, under the effect of its own weight, therein, as shown in FIG. 10.

After having reached the upper part 21 of the chamber 20, the apple P rolls and/or slides downward against the guide surface 11A, until it comes into contact with the inner face 21A of the upper part 22 of the chamber: subject to maintenance of the rotational driving of the upper stage 11 of the screw 10, the apple finds itself in the fragmentation position described above and shown in FIGS. 3 to 11. While the apple P is firmly blocked by cooperation between an outer half and, at the same time, the edge 213 and a bottom region of the hollow surface 212, the edge 113 of the upper stage 11 of the screw 10 crushes the inner half of the apple P. Given the nature of the material making up the apple P, the crushing edge 113 sinks into the apple, like the edge 213, until the apple breaks, by priming in a diametric plane between its inner and outer halves, then by tearing of its material, forming two or more fragments having irregular shapes, related to pulling and/or distortions of the material of the apple.

The apple fragments are next gradually driven and pressed at the interface between the lower stage 12 of the screw 10 and the lower part 22 of the chamber 20, subject to the maintained rotational driving of this lower stage 12. The juice resulting from the pressing of these fragments is recovered outside the chamber 20 by the collection means 60, while the pressing residues are retained inside the lower end 220 of the lower part 22 of the chamber, until these residues are accumulated such that the lip 122 deforms toward the axis X-X, then allowing the discharge of the residues between this deformed lip and the inner face of the lower end 220 of the chamber so that these residues reach the conduit 50. It will be understood that, owing to the lip 122, the pressing residues are not discharged too quickly, thereby increasing the pressing performance, in the sense that maximum juice is obtained. If applicable, the user adjusts the resistance from the lip 122 against the discharge of the residues, to optimize the performance, without saturating the inside of the lower part 22 of the chamber 20.

More globally, the example described above makes it possible to understand the interest of the appliance 1 in that it separates the driving of the upper stage 11 of the screw 10 and the driving of the lower stage 12 of the screw, to control the respective functions of these two stages, i.e., the fragmentation function for the upper stage 11 and the pressing function for the lower stage 12. Thus, without sacrificing the quality of the juice obtained by the appliance 1, the latter is particularly practical to use and guarantees good pressing performance.

Various arrangements and alternatives of the appliance 1 described thus far can also be considered. As examples:
  rather than the lip 122 being fixedly secured to the lower end of the lower stage 12 of the screw 10, this lip can be attached to this lower end of the lower stage 12, while being rotatably separated with respect to the latter; in particular, the lip 122 can be provided fixed in rotation relative to the chamber 20; in this case, the sealing between this lip and the lower end of the lower stage 12 of the screw 10 must be ensured, despite the relative rotation between these two parts; and/or in order to further increase the range of foods effectively processed by the appliance 1, the sieving region of the lower part 22 of the chamber 20 can be provided to be interchangeable to change the size of the through orifices 221; in other words, the fineness of the sieving can be modified, taking into account the foods to be processed.

The invention claimed is:

1. An electrical appliance for preparing juice by pressing food, comprising:
 a chute for taking in the food downward;
 a screw for processing the food leaving the chute, said screw being centered on an axis and including:
  an upper stage that is provided with a sweeper for acting at an outlet of the chute on the food leaving the chute to fragment the food, and
  a lower stage, which is separate from the upper stage of the screw and which is configured to drive and press the fragments of food downward coming from the upper stage of the screw;
 a chamber for receiving the screw, the chamber being centered on the axis and including:
  an upper part that is connected to the outlet of the chute to receive the food leaving the chute and that surrounds the upper stage of the screw, and
  a lower part, which surrounds the lower stage of the screw and is configured to separate the juice from the food fragments when the food fragments are pressed by the lower stage of the screw; and
 a driving system for driving the screw, which includes:
  a first electric motor which has a driving output that is rotatably coupled to the upper stage of the screw by a first coupling mechanism to drive the upper stage of the screw around the axis, relative to the chamber, at a first rotation speed and in a first rotation direction adjustably and independently of the lower stage of the screw, and
  a second electric motor which is separate from the first motor and has a driving output that is rotatably coupled to the lower stage of the screw by a second coupling mechanism to drive the lower stage of the screw around the axis, relative to the chamber, at a second rotation speed and in a second rotation direction adjustably and independently of the upper stage of the screw, the first coupling mechanism being separate from the second coupling mechanism, and the first rotation speed being different from the second rotation speed and/or the first rotation direction being different from the second rotation direction.

2. The appliance according to claim 1,
 wherein an upper end of the upper stage of the screw forms a ring, which is centered on the axis and which connects the rest of the upper stage of the screw to the first coupling mechanism,
 wherein the sweeper extends downward from the ring, and
 wherein the outlet of the chute is connected to the upper part of the chamber through inside of the ring.

3. The appliance according to claim 1,
 wherein the appliance further includes a discharge conduit for discharging pressing food residues, the discharge conduit being connected to a lower end of the lower part of the chamber, and
 wherein a lower end of the lower stage of the screw is provided with a peripheral lip, which is complementary to an inner face of the lower end of the lower part of the chamber and which is configured, under an action of the pressing food residues driven by the lower stage of the screw, to move elastically away from the inner face of the lower end of the lower part of the chamber so as to allow the pressing food residues to pass from the lower part of the chamber to the discharge conduit.

4. The appliance according to claim 3, wherein the peripheral lip is provided with arrangements for adjusting resistance to the pressing food residues passing between the peripheral lip and the inner face of the lower end of the lower part of the chamber.

5. The appliance according to claim 3, wherein the discharge conduit extends the lower end of the lower part of the chamber downward and is provided with a rotating sweeping device, which is rotated around the axis by the second coupling mechanism and the second motor and which sweeps an outlet of a passage that is formed between the inner face of the lower end of the lower part of the chamber and the peripheral lip when the peripheral lip is deformed.

6. The appliance according to claim 1, wherein the outlet of the chute is inwardly centered on the axis.

7. The appliance according to claim 1, wherein the chute is entirely inwardly centered on the axis.

8. The appliance according claim 1, wherein the sweeper comprises an edge defined by the upper stage of the screw, the edge being configured to crush the food.

9. The appliance according to claim 1, wherein the sweeper consists of an edge defined by the upper stage of the screw, the edge being configured to crush the food.

10. The appliance according to claim 1,
 wherein the chute geometrically defines an inscribed sphere able to pass freely through the chute, and
 wherein the upper part of the chamber is inwardly provided with blocking features for blocking the rotation of the food when the blocking features are in contact with the sweeper, such that, at the outlet of the chute, the inscribed sphere is movable inside the upper part of the chamber, to a fragmentation position in which:
  by formation of a first contact zone between the inscribed sphere and the blocking features, the blocking features oppose a rolling of the inscribed sphere in the first rotation direction of the upper stage of the screw, against an inner face of the upper part of the chamber,
  by formation of a second contact zone between the inscribed sphere and the blocking features, the blocking features oppose a rolling of the inscribed sphere in a rotation direction opposite to the first rotation direction of the upper stage of the screw, against the inner face of the upper part of the chamber, the second contact zone being formed in a half of the inscribed sphere which is turned opposite the axis and which is defined by a diametric plane of the inscribed sphere, both parallel to the axis and passing through the first contact zone, and
  by formation of a third contact zone between the inscribed sphere and the sweeper, the sweeper crushes the inscribed sphere in the first rotation direction of the upper stage of the screw, the third contact zone being formed in a half of the inscribed sphere opposite to the half of the inscribed sphere in which the second contact zone is formed.

11. The appliance according to claim 1, wherein each coupling mechanism comprises:
a rotating part, which is centered on the axis and which is secured to the upper stage of the screw, and
a transmission member, which outwardly surrounds the rotating part of the first coupling mechanism so as to be able to rotate the rotating part of the first coupling mechanism, and which is set in motion by the driving output of the first motor,
and wherein the second coupling mechanism comprises:
a rotating part, which is centered on the axis and which is secured to the lower stage of the screw, and
a transmission member, which outwardly surrounds the rotating part of the second coupling mechanism so as to be able to rotate the rotating part of the second coupling mechanism, and which is set in motion by the driving output of the second motor.

12. The appliance according to claim 11,
wherein an upper end of the upper stage of the screw forms a ring, which is centered on the axis and which connects the rest of the upper stage of the screw to the rotating part of the first coupling mechanism,
wherein the sweeper extends downward from the ring, and
wherein the outlet of the chute is connected to the upper part of the chamber through inside of the ring.

13. The appliance according to claim 12, wherein the rotating part of the first coupling mechanism is secured to the ring.

14. The appliance according to claim 13, wherein the rotating part of the first coupling mechanism is annular and is arranged in an upward extension of the ring.

15. An electrical appliance for preparing juice by pressing food, comprising:
a chute for taking in food toward the bottom;
a screw for processing the food leaving the chute, said screw being centered on an axis and including:
an upper stage that is provided with a sweeper for acting at an outlet of the chute on the food leaving the chute to fragment the food, and
a lower stage, which is separate from the upper stage of the screw and which is configured to drive and press the fragments of food downward coming from the upper stage of the screw;
a chamber for receiving the screw, the chamber being centered on the axis and including:
an upper part that is connected to the outlet of the chute to receive the food leaving the chute and that surrounds the upper stage of the screw, and
a lower part, which surrounds the lower stage of the screw and is configured to separate the juice from the food fragments when the food fragments are pressed by the lower stage of the screw; and
a driving system for driving the screw, the driving system including at least one electric motor, which is configured to drive the upper stage of the screw around the axis, relative to the chamber, at a first rotation speed and in a first rotation direction adjustably and independently of the lower stage of the screw, and which is configured to drive the lower stage of the screw around the axis, relative to the chamber, at a second rotation speed and in a second rotation direction adjustably and independently of the upper stage, the first rotation speed being different from the second rotation speed and/or the first rotation direction being different from the second rotation direction,
wherein the chute geometrically defines an inscribed sphere able to pass freely through the chute, and
wherein the upper part of the chamber is inwardly provided with blocking features for blocking the rotation of the food when the blocking features are in contact with the sweeper, such that, at the outlet of the chute, the inscribed sphere is movable inside the upper part of the chamber, to a fragmentation position in which:
by formation of a first contact zone between the inscribed sphere and the blocking features, the blocking features oppose rolling of the inscribed sphere in the first rotation direction of the upper stage of the screw, against an inner face of the upper part of the chamber,
by formation of a second contact zone between the inscribed sphere and the blocking features, the blocking features oppose rolling of the inscribed sphere in a rotation direction opposite to the first rotation direction of the upper stage of the screw, against the inner face of the upper part of the chamber, the second contact zone being formed in a half of the inscribed sphere which is turned opposite the axis and which is defined by a diametric plane of the inscribed sphere, both parallel to the axis and passing through the first contact zone, and
by formation of a third contact zone between the inscribed sphere and the sweeper, the sweeper crushes the inscribed sphere in the first rotation direction of the upper stage of the screw, the third contact zone being formed in a half of the inscribed sphere opposite to the half of the inscribed sphere in which the second contact zone is formed.

16. The appliance according to claim 15, wherein the driving system includes first and second electric motors that are separate from one another, a driving output of the first motor being coupled to the upper stage of the screw, and a driving output of the second motor being coupled to the lower stage of the screw.

17. The appliance according to claim 15,
wherein an upper end of the upper stage of the screw forms a ring, which is centered on the axis and which connects the rest of the upper stage of the screw to the driving system,
wherein the sweeper extends downward from the ring, and
wherein the outlet of the chute is connected to the upper part of the chamber through inside of the ring.

18. The appliance according to claim 15, wherein the outlet of the chute is inwardly centered on the axis.

19. The appliance according to claim 15, wherein the chute is entirely inwardly centered on the axis.

20. The appliance according claim 15, wherein the sweeper comprises an edge defined by the upper stage of the screw, the edge being configured to crush the food.

* * * * *